(12) United States Patent
Stein

(10) Patent No.: US 6,403,105 B1
(45) Date of Patent: *Jun. 11, 2002

(54) CURABLE SILICONE FOUL RELEASE COATING AND ARTICLES

(75) Inventor: Judith Stein, Schenectady, NY (US)

(73) Assignee: General Electric Company, Schenectady, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/695,743

(22) Filed: Oct. 25, 2000

Related U.S. Application Data

(62) Division of application No. 09/149,063, filed on Sep. 8, 1998, now Pat. No. 6,180,249.

(51) Int. Cl.$^7$ .............................. A61K 9/00; B32B 9/04
(52) U.S. Cl. .................... 424/400; 424/78.09; 428/447; 106/287.14; 106/287.16; 427/387; 528/14; 528/17; 528/18; 528/901; 524/265; 524/267; 524/268; 524/493; 524/731; 524/837
(58) Field of Search ............................ 424/78.09, 400; 428/447; 106/287.14, 287.16; 427/387; 524/265, 267, 268, 493, 731, 837, 858, 859, 863; 528/14, 17, 18, 901

(56) References Cited

U.S. PATENT DOCUMENTS

| | | | |
|---|---|---|---|
| 4,005,923 A | | 2/1977 | Davis, Jr. .................. 339/157 |
| 4,861,670 A | | 8/1989 | Lampe et al. .................. 428/99 |
| 5,116,611 A | * | 5/1992 | Masuoka et al. ......... 424/78.09 |
| 5,298,060 A | * | 3/1994 | Harakal et al. .......... 424/78.09 |
| 5,332,431 A | * | 7/1994 | Yokoi et al. ............. 424/78.09 |
| 5,691,019 A | | 11/1997 | Carroll et al. ............. 428/40.1 |
| 5,904,988 A | * | 5/1999 | Stein et al. ................. 428/447 |
| 6,107,381 A | * | 8/2000 | Stein et al. ................. 524/265 |
| 6,180,249 B1 | * | 1/2001 | Stein et al. ................. 428/447 |

FOREIGN PATENT DOCUMENTS

| | | | |
|---|---|---|---|
| EP | 063388 A1 | | 10/1982 |
| EP | 0089071 | * | 9/1983 |
| EP | 566936 A1 | | 10/1993 |
| EP | 881269 A2 | | 12/1998 |
| EP | 885938 A2 | | 12/1998 |
| FR | 2297901 | | 1/1976 |
| WO | 9200357 | | 1/1992 |

OTHER PUBLICATIONS

Organic Compatible Silicone Fluids, Gelest, Inc. Materials Catalogue, 1998, p. 466.

* cited by examiner

*Primary Examiner*—Thurman K. Page
*Assistant Examiner*—Lakshmi Channavajjala
(74) *Attorney, Agent, or Firm*—Bernadette M. Bennett; Noreen C. Johnson

(57) ABSTRACT

A condensation curable coating composition comprises the following and any reaction product thereof: (A) a room temperature vulcanizable polyorganosiloxane composition; and (B) a marine foul release-enhancing proportion of at least one organic compatible silicone fluid free from silanol groups and being capable of blooming to the surface of a cured product of component A.

14 Claims, No Drawings

CURABLE SILICONE FOUL RELEASE COATING AND ARTICLES

This application is a division of application Ser. No. 09/149,063, filed Sep. 8, 1998 now U.S. Pat. No. 6,180,249 which is hereby incorporated by reference in its entirety.

This invention was made with government support under Contract No. N0001 4-96-C-0 145 awarded by DARPA. The government may have certain rights in the invention.

BACKGROUND OF THE INVENTION

This invention relates to foul release coatings and articles coated therewith. More particularly, this invention relates to foul release coatings containing organic compatible oils that have enhanced foul release performance.

A perennial major aggravation to shippers and users of marine equipment in contact with water is the tendency of such equipment to become encrusted with varieties of wildlife, as illustrated by barnacles and zebra mussels. This tendency is often referred to as marine fouling.

U.S. Pat. No. 4,861,670 describes in considerable detail, the types of treatments that have been employed, starting as early as 1854, to minimize marine fouling. Treatment materials have included compounds of such metals as copper, tin, arsenic, mercury, zinc, lead, antimony, silver and iron, as well as toxic organic materials such as strychnine and atropine. Due to environmental concerns, the use of such materials has been discouraged.

More recently, polyorganosiloxanes (hereinafter sometimes designated "silicones" for brevity) have been found useful as anti-fouling coatings. They include condensation cured room temperature vulcanizable (hereinafter sometimes "RTV") compositions comprising silica or calcium carbonate as a filler in combination with silanol- or dialkoxy-terminated silicones, catalysts and crosslinking agents. They may be made sprayable by dilution with solvents, typically volatile organic compounds such as hydrocarbons.

There is still a need, however, to improve various properties of RTV-based foul release coatings, particularly their release efficiency and their effective lifetime.

SUMMARY OF THE INVENTION

The present invention satisfies this need by the discovery that the addition of specifically defined organic compatible oils to a conventional RTV formulation improves foul release properties. It includes foul release coatings having said improved properties and articles coated with said improved foul release coatings.

In one of its aspects, the invention is directed to condensation curable coating compositions comprising the following and any reaction products thereof:

(A) a one- or two-part room temperature vulcanizable polyorganosiloxane composition, and (B) a marine foul release-enhancing proportion of at least one organic compatible silicone fluid free from silanol groups and being capable of blooming to the surface of the cured product of component A.

Another aspect of the invention is articles comprising a marine structure coated with an anti-fouling coating, which is the condensation cured reaction product of the composition defined hereinabove.

DETAILED DESCRIPTION

The word "component" is frequently employed herein for brevity to designate the materials present in the compositions of the invention. Its use is independent of the possible interreaction of said materials to form other chemical constituents.

Component A of the compositions of the invention may be a conventional one-part or two-part RTV composition; it is most often a two-part composition. It typically comprises at least one reactive silicone, at least one condensation catalyst and at least one crosslinking agent.

The reactive silicone is most often a polydialkylsiloxane, typically of the formula

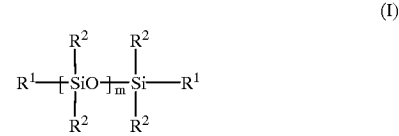

wherein each $R^1$ is a hydroxyl radical or

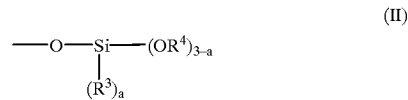

each $R^2$ is independently a hydrocarbon or fluorinated hydrocarbon radical, each $R^3$ and $R^4$ is a hydrocarbon radical, a is 0 or 1 and m has a value such that the viscosity of said reactive silicone under ambient temperature and pressure conditions is up to about 50,000 centipoise. Illustrative hydrocarbon radicals are C1–20 alkyl, C6–20 aryl and alkaryl, vinyl, isopropenyl, allyl, butenyl and hexenyl, with C1–4 alkyl and especially methyl being preferred. An illustrative fluorinated hydrocarbon radical is 3,3,3-trifluoropropyl. Most often, each $R^2$, $R^3$ and $R^4$ is alkyl and preferably methyl.

It is within the scope of the invention to employ two or more reactive silicones, differing in average molecular weight. This may afford a bimodal composition having performance advantages over a simple monomodal composition.

The condensation catalyst may be any of those known to be useful for promoting condensation curing of an RTV material. Suitable catalysts include tin, zirconium and titanium compounds as illustrated by dibutyltin dilaurate, dibutyltin diacetate, dibutyltin methoxide, dibutyltin bis (acetylacetonate), 1,3-dioxypropanetitanium bis (acetylacetonate), titanium naphthenate, tetrabutyl titanate and zirconium octanoate. Various salts of organic acids with such metals as lead, iron, cobalt, manganese, zinc, antimony and bismuth may also be employed, as may non-metallic catalysts such as hexylammonium acetate and benzyltrimethylammonium acetate. For most purposes, the tin and titanium compounds are preferred.

As crosslinking agents, trifunctional (T) and tetrafunctional (Q) silanes are useful, the term "functional" in this context denoting the presence of a silicon-oxygen bond. They include such compounds as methyltrimethoxysilane, methyltriethoxysilane, 2-cyanoethyltrimethoxysilane, methyltriacetoxysilane, tetraethyl silicate and tetra-n-propyl silicate. The Q-functional compounds, i.e., tetraalkyl silicates, are often preferred.

Component A may contain other constituents, including reinforcing and extending (non-reinforcing) fillers. Suitable reinforcing fillers have a primary particle size of about 10 nm and are available in the form of aggregated particles of about 100 to about 250 nm. The preferred fillers are the silica fillers, including fumed silica and precipitated silica. These two forms of silica have surface areas in the ranges of 90–325 and 8–150 m²/g, respectively.

The reinforcing filler is most often pretreated with a treating agent to render it hydrophobic. Typical treating agents include cyclic silicones such as cyclooctamethyltetrasiloxane and acyclic and cyclic organosilazanes such as hexamethyldisilazane, 1,3-divinyl-1,1,3,3-tetramethyldisilazane, hexamethylcyclotrisilazane, octamethylcyclotetrasilazane and mixtures of these. Hexamethyldisilazane is often preferred.

Non-reinforcing fillers include titanium dioxide, lithopone, zinc oxide, zirconium silicate, iron oxides, diatomaceous earth, calcium carbonate, glass fibers or spheres, magnesium oxide, chromic oxide, zirconium oxide, aluminum oxide, crushed quartz, calcined clay, talc, kaolin, asbestos, carbon, graphite, cork, cotton and synthetic fibers.

The proportions of the constituents of component A may be varied widely. The amount of filler is generally about 5–200 parts and preferably about 10–150 parts by weight per 100 parts of reactive silicone. Catalysts and crosslinkers are generally present in the amounts of about 0.001–2.5% and about 0.25–5.0% by weight respectively, based on the combination of reactive silicone and filler.

Component B is an organic compatible silicone fluid. An organic compatible silicone fluid is an organosiloxane fluid that has imparted organic character from incorporated alkyl groups or aromatic substituted alkyl (aryl-alkyl and aryloxy-alkyl) groups. Preferably, the organic compatible silicone fluid comprises about 2 to 100 mole % higher alkyl (C6–C20) or substituted aryl-alkyl radicals. More preferably, the organic compatible silicone fluid comprises about 10 to 70 mole % higher alkyl (C6–C20) or substituted aryl-alkyl radicals. The organic compatible silicone fluids suitable in the present invention are free from silanol groups and are characterized by pour points in the range from about −60° C. to about 80° C., preferably from about −50° C. to about 30° C. and most preferably from about −50° C. to about 0° C. These fluids exhibit an extended range of organic compatibility and lubricity.

Examples of organic compatible silicone fluids include alkylmethylsiloxane homopolymers such as polyoctylmethylsiloxane, polytetradecylmethylsiloxane and polyoctyldecylmethylsiloxane; alkylmethylsiloxane/arylmethylsiloxane copolymers such as ethylmethylsiloxane/2-phenylpropylmethylsiloxane copolymer, hexylmethylsiloxane/phenylpropylmethylsiloxane copolymer, decylmethylsiloxane/butylated aryloxypropylmethylsiloxane copolymer and dodecylmethylsiloxane/2-phenylpropylmethylsiloxane copolymer; alkylmethylsiloxane/dimethylsiloxane copolymers such as octadecylmethylsiloxane/dimethylsiloxane copolymer and triacontylmethylsiloxane/dimethylsiloxane copolymer; and dialkylsiloxane homopolymers such as dicyclopentylsiloxane polymer.

One class of illustrative organic compatible silicone fluids is disclosed in U.S. Pat. No. 4,005,023, which is incorporated herein by reference. Some of these fluids are included in the following formula that represents suitable linear and nonlinear polymers and copolymers;

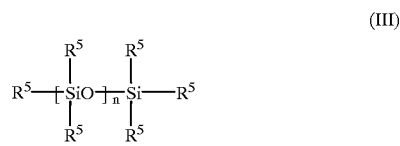

(III)

where n varies from 1 to 8000 and $R^5$ is selected from the class consisting of monovalent hydrocarbon radicals, halogenated monovalent hydrocarbon radicals, monovalent alkoxyalkyl and monovalent aryloxyalkyl radicals and the viscosity of the fluid varies from 20 to 4000 centistokes at 25° C. In the present invention, the $R^5$ radicals on the polymer can be the same or different. Preferably each radical is selected from lower alkyl radicals of 1 to 20 carbon atoms, substituted alkyl radicals of 6 to 20 carbon atoms and aryloxyalkyl radicals of 7 to 50 carbon atoms.

Illustrative organic compatible silicone fluids are available from Gelest, Inc., under the trade designations ALT. One illustration of such a compound is ALT251, which is a decylmethylsiloxane/butylated aryloxypropylmethylsiloxane copolymer with a pour point of −51° C. and a viscosity of 40–60 centipoise.

Component B is present in the compositions of the invention in an effective proportion to enhance foul release properties. For the most part, about 5–20 parts by weight per 100 parts of component A is adequate.

A member of a mixture that forms a thin coating will sometimes migrate to the surface of the coating because of its incompatibility with another member of the mixture. This phenomena is called "blooming." The essential property of component B is that of blooming to the surface of the cured product of component A during or after the curing process, by reason of its incompatibility with component A.

The compositions of this invention may also incorporate further constituents such as non-reactive silicone oils, dyes, solubilizing agents and solvents to render them sprayable if sprayability is desirable. These may be introduced as part of component A or as adjuvants to the entire composition, as appropriate.

The marine structure in the articles of the invention is often a ship's hull. However, any structure that is utilized in a marine environment and is subject to fouling can be the marine structure of the invention. Such marine structures include, for example, liquid collecting and discharge pipes, dry dock equipment and the like. Suitable materials for such structures include metals such as iron and aluminum and resinous materials such as fiber-reinforced thermoplastic or thermoset resins.

Application of the compositions of the invention is typically preceded by the application of conventional pretreatment layers. These may include, for example, anti-corrosive epoxy primers, mist coats and tie-layers comprising polyorganosiloxanes and toughening components. The compositions of the invention may be applied by conventional techniques such as brushing or drawing down, or by spraying if they are suitably diluted.

Solvent can be mixed into the composition of the invention to prepare the composition for application to a marine structure. Suitable solvents for spray applications include aromatic hydrocarbons such as toluene or xylene and aliphatic hydrocarbons such as petroleum naphtha.

The invention is illustrated by the following examples. All parts and percentages in the examples are by weight.

EXAMPLE 1

A condensation curable RTV composition was prepared by blending the following constituents in the amounts indicated:

Part I

The following were combined as part I: silanol-stopped polydimethylsiloxane, viscosity 30,000 centipoise—100 parts; non-reactive polydimethylsiloxane oil, viscosity 20 centipoise—38.5 parts; n-propyl silicate—12.13 parts; fumed silica, and hexamethyldisilazane-treated—37 parts.

Part II

Dibutyltin dilaurate was added as part II.

The two parts were combined in proportions such that the dibutyltin dilaurate was present in the amount of 2.43 parts per 100 parts of the silanol-stopped polydimethylsiloxane.

To the resulting RTV composition was added 10% by weight, based on the RTV composition, of an organic compatible silicone fluid, which was a polydimethylsiloxane having 47 mole % decyl groups and 2 mole % butylated aryloxypropyl groups and a viscosity of 40–60 centipoise.

The composition thus prepared was applied by spray coatings to steel panels which had been previously coated with a commercially available epoxy anti-corrosion coating, mist coat and tie-layer. The test panels were exposed to water for 7 months, after which time the barnacle adhesion strength was measured in accordance with ASTMD5618. The barnacle adhesion value was 5.1 psi where the control value was 10.9 psi.

EXAMPLE 2

An RTV composition was prepared by blending (Part I) 70 parts of a silanol-terminated polydimethylsiloxane having a viscosity of 3,100 centipoise, 90 parts of calcium carbonate and 2 parts tetraethyl silicate and (Part II) 0.5 part of dibutyltin dilaurate. An organic compatible silicone fluid was added in the amount of 10% based on RTV composition. The an organic compatible silicone fluid was a polydimethylsiloxane having 47 mole % decyl groups and 2 mole % butylated aryloxypropyl groups and a viscosity of 40–60 centipoise.

Steel test panels similar to those of Example 1, were coated with an anticorrosion coating, primed with a commercially available primer and then spray coated with the composition of Example 2. The test panels were then submerged in a salt water lagoon in Florida in cages for seven months. At the end of the test period, barnacle adhesion, as determined by ASTM test procedure D5618, for the panels coated with the product of Examples 2 were 5.9 psi. A control panel coated with the RTV composition only had a barnacle adhesion of 10.35 psi.

What is claimed is:

1. An article comprising a marine structure coated with an anti-fouling coating which is the reaction product of a condensation curable coating composition comprising the following:

(A) a room temperature vulcanizable polyorganosiloxane composition comprising at least one reactive silicone, at least one condensation catalyst and at least one crosslinking agent, the reactive silicone being a polydialkylsiloxane having the formula:

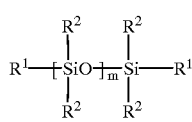

(I)

wherein each $R^1$ is a hydroxyl radical or

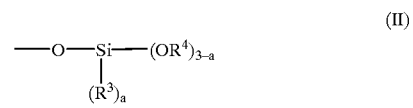

(II)

wherein each $R^2$ is independently a hydrocarbon or fluorinated hydrocarbon radical, each $R^3$ and $R^4$ is a hydrocarbon radical, a is 0 or 1 and m has a value such that the viscosity of said reactive silicone under ambient temperature and pressure conditions is up to about 6,000 centipoise; and (B) about 5–20 parts by weight, per 100 parts of component A, of at least one organic compatible silicone fluid capable of blooming to the surface of the cured product of component A, said silicone fluid having the formula

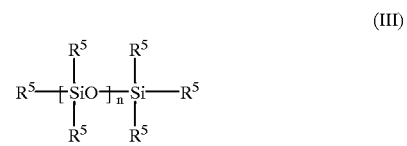

(III)

where n varies from 1 to 8000 and $R^5$ is selected from the class consisting of from lower alkyl radicals of 1 to 20 carbon atoms, substituted alkyl radicals of 6 to 20 carbon atoms and aryloxyalkyl radicals of 7 to 50 carbon atoms, about 2 to 100 mole % of the $R^5$ radicals being $C_{6-20}$ alkyl radicals or substituted aryl-alkyl radicals.

2. An article according to claim 1, wherein the organic compatible silicone fluid comprises about 10–70 mole % $C_{6-20}$ alkyl radicals or substituted aryl-alkyl radicals.

3. An article according to claim 1, wherein the organic compatible silicone fluid is selected from the group consisting of an alkylmethylsiloxane homopolymer, an alkylmethylsiloxane/arylmethylsiloxane copolymer, an alkylmethylsiloxane/dimethylsiloxane copolymer and a dialkylsiloxane homopolymer.

4. An article according to claim 1, wherein the viscosity of the organic compatible silicone fluid varies from 20 to 4000 centistokes at 25° C.

5. An article according to claim 1, wherein $R^5$ is selected from lower alkyl radicals of 1 to 20 carbon atoms, substituted alkyl radicals of 6 to 20 carbon atoms and aryloxyalkyl radicals of 7 to 50 carbon atoms.

6. An article according to claim 1, wherein the organic compatible silicone fluid is characterized by a pour point in the range from about −60° C. to about 80° C.

7. An article according to claim 1, wherein the organic compatible silicone fluid is characterized by a pour point in the range from about −50° C. to about 30° C.

8. An article according to claim 1, wherein the organic compatible silicone fluid is characterized by a pour point in the range from about −50° C. to about 0° C.

9. An article according to claim 1, wherein each $R^2$ is methyl.

10. An article according to claim 9, wherein each $R^1$ is hydroxyl.

11. An article according to claim 10, wherein each $R^1$ has structure II.

12. An article according to claim 1, wherein the condensation catalyst is a tin, zirconium or titanium compound.

13. An article according to claim 1, wherein the crosslinking agent is a trifunctional or tetrafunctional silane.

14. A method of protecting a structure from marine fouling, comprising coating said structure with a condensation curable coating composition comprising the following and any reaction product thereof:

(A) a room temperature vulcanizable polyorganosiloxane composition comprising at least one reactive silicone, at least one condensation catalyst and at least one crosslinking agent, the reactive silicone being a polydialkylsiloxane having the formula:

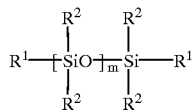

(I)

wherein each $R^1$ is a hydroxyl radical or

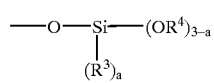

(II)

wherein each $R^2$ is independently a hydrocarbon or fluorinated hydrocarbon radical, each $R^3$ and $R^4$ is a hydrocarbon radical, a is 0 or 1 and m has a value such that the viscosity of said reactive silicone under ambient temperature and pressure conditions is up to about 6,000 centipoise; and (B) about 5–20 parts by weight, per 100 parts of component A, of a marine foul release-enhancing proportion of at least one organic compatible silicone fluid capable of blooming to the surface of the cured product of component A, said silicone fluid having the formula

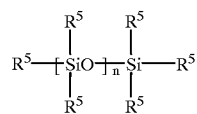

(III)

where n varies from 1 to 8000 and $R^5$ is selected from the class consisting of from lower alkyl radicals of 1 to 20 carbon atoms, substituted alkyl radicals of 6 to 20 carbon atoms and aryloxyalkyl radicals of 7 to 50 carbon atoms, about 2 to 100 mole % of the $R^5$ radicals being $C_{6-20}$ alkyl radicals or substituted aryl-alkyl radicals.

* * * * *